US 12,419,225 B2

(12) United States Patent
Dindorkar

(10) Patent No.: US 12,419,225 B2
(45) Date of Patent: Sep. 23, 2025

(54) UNIFORM BALE FORMATION SYSTEM

(71) Applicant: DEERE & COMPANY, Moline, IL (US)

(72) Inventor: Nikhil N. Dindorkar, Pune (IN)

(73) Assignee: DEERE & COMPANY, Moline, IL (US)

( * ) Notice: Subject to any disclaimer, the term of this patent is extended or adjusted under 35 U.S.C. 154(b) by 1002 days.

(21) Appl. No.: 17/450,618

(22) Filed: Oct. 12, 2021

(65) Prior Publication Data

US 2023/0112403 A1    Apr. 13, 2023

(51) Int. Cl.
*A01F 15/10*    (2006.01)
*A01F 15/08*    (2006.01)
*A01F 15/18*    (2006.01)

(52) U.S. Cl.
CPC ........ *A01F 15/106* (2013.01); *A01F 15/0833* (2013.01); *A01F 15/18* (2013.01)

(58) Field of Classification Search
CPC .... A01F 15/106; A01F 15/0833; A01F 15/18; A01F 15/10; A01F 15/0825
See application file for complete search history.

(56) References Cited

U.S. PATENT DOCUMENTS 4,686,820 A * 8/1987 Andra ................. A01F 15/0833
100/88
6,874,412 B1 * 4/2005 Glaszcz .............. A01F 15/0833
100/88
2010/0071339 A1 * 3/2010 Viaud .................... A01D 90/04
56/341

FOREIGN PATENT DOCUMENTS

| EP | 3369305 A1 | 9/2018 | |
| EP | 3756448 A1 | 12/2020 | |
| WO | WO2011012953 A1 | 2/2011 | |
| WO | WO-2017009194 A1 * | 1/2017 | ......... A01F 15/0825 |
| WO | WO-2020089338 A1 * | 5/2020 | ........... A01F 15/046 |

OTHER PUBLICATIONS

Extended European Search Report and Written Opinion issued in European Patent Application No. 22197269.8, dated Feb. 27, 2023, in 12 pages.

* cited by examiner

*Primary Examiner* — Joseph M Rocca
*Assistant Examiner* — Ashley A Kaercher

(57) ABSTRACT

A baler implement has a pick-up to gather crop material, a baling chamber having an inlet, and a uniform feeding apparatus. The uniform feeding apparatus includes a flap. The flap is positioned downstream of the pick-up and upstream of the inlet relative to movement of the crop material along a crop path. The flap is selectively controllable for movement relative to a central longitudinal axis of the baler implement between a first position of the flap to direct the crop material toward a first lateral side of the baling chamber relative to the central longitudinal axis, and a second position of the flap to direct the crop material toward a second lateral side of the baling chamber relative to the central longitudinal axis.

15 Claims, 11 Drawing Sheets

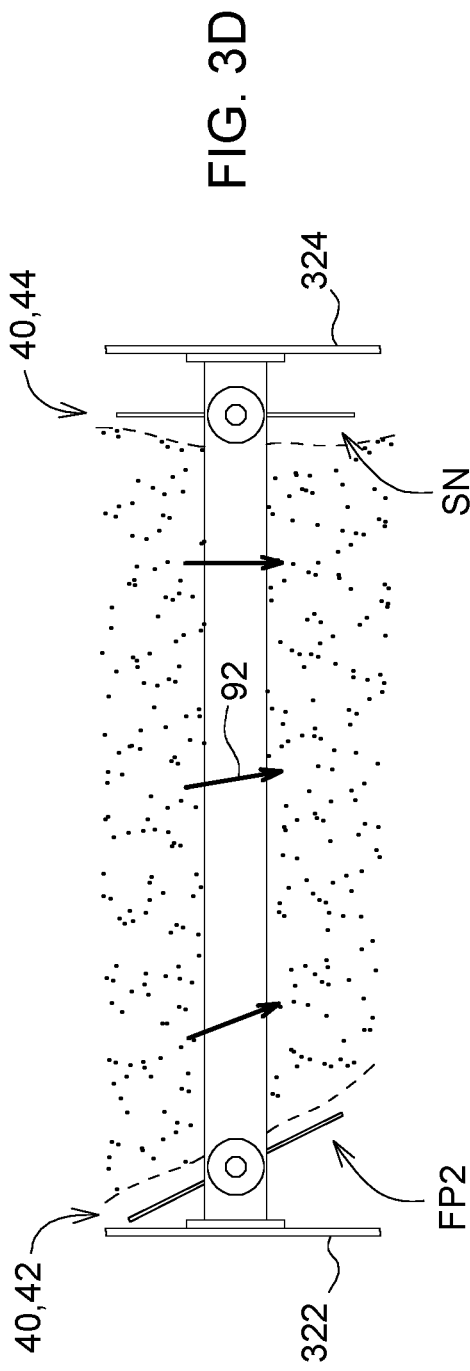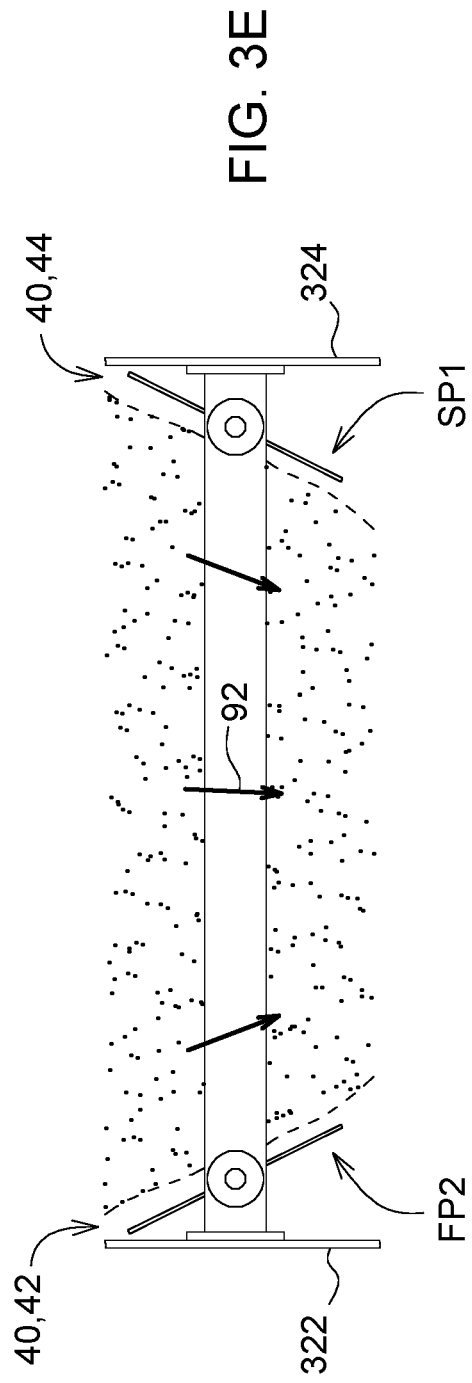

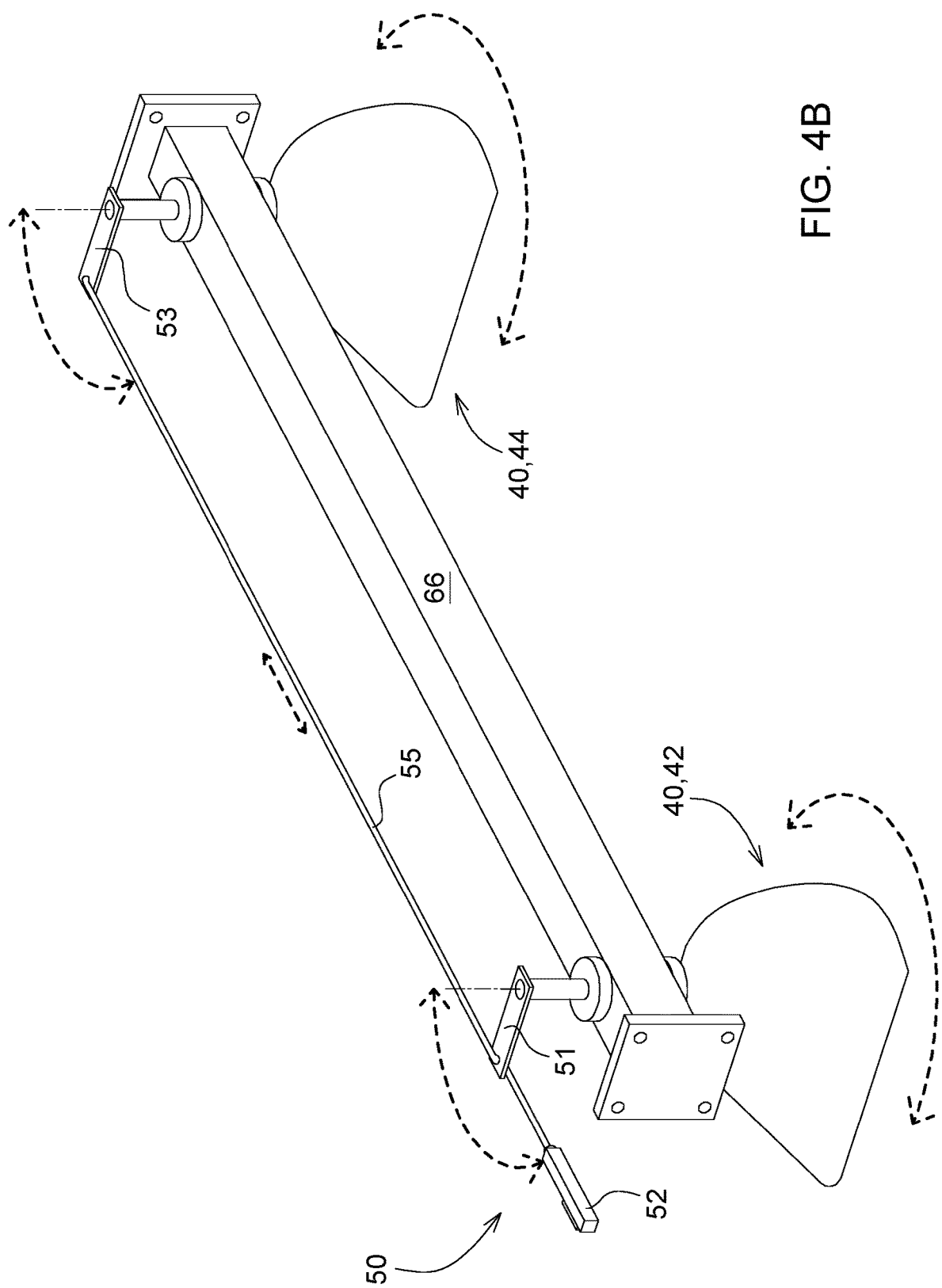

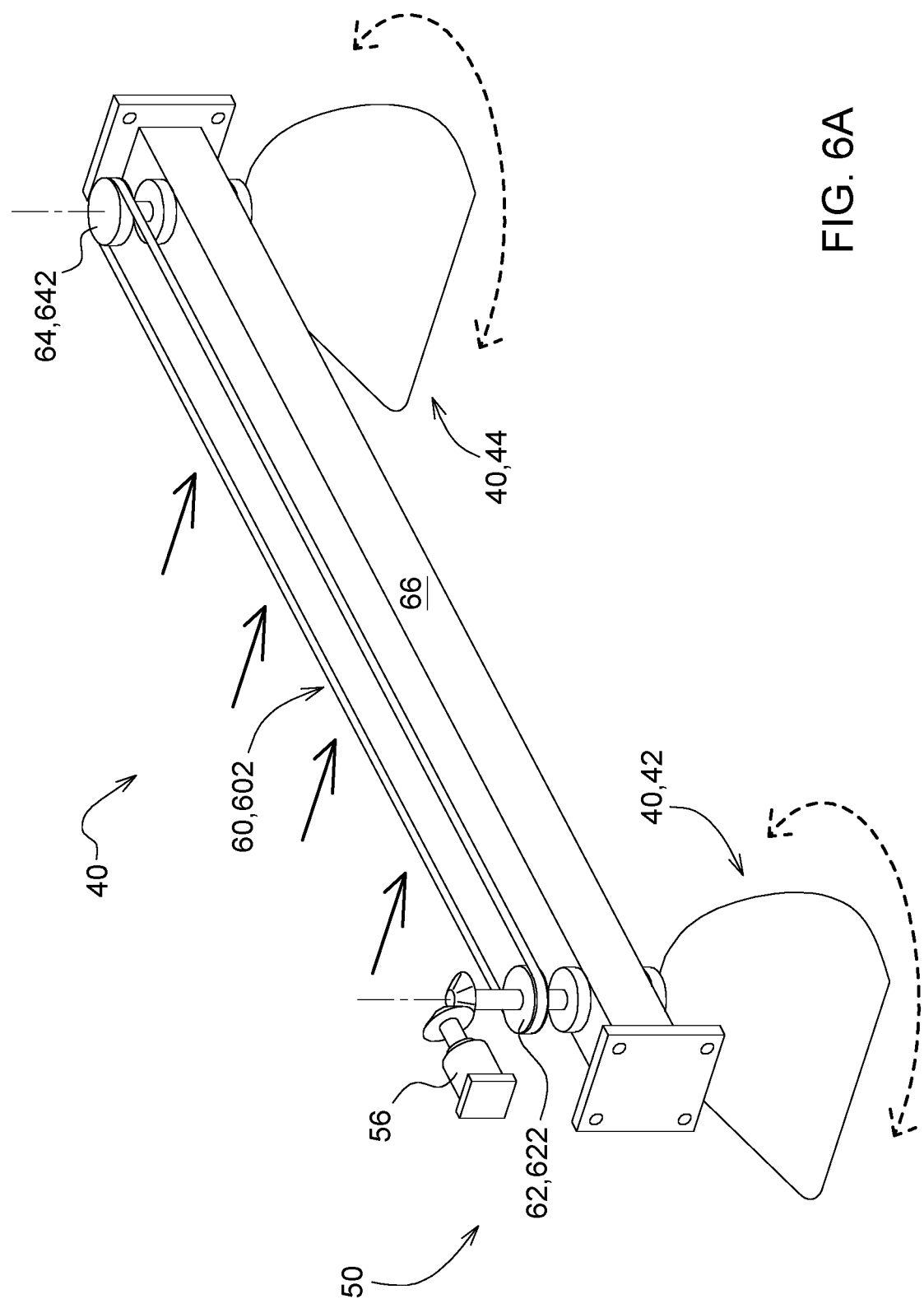

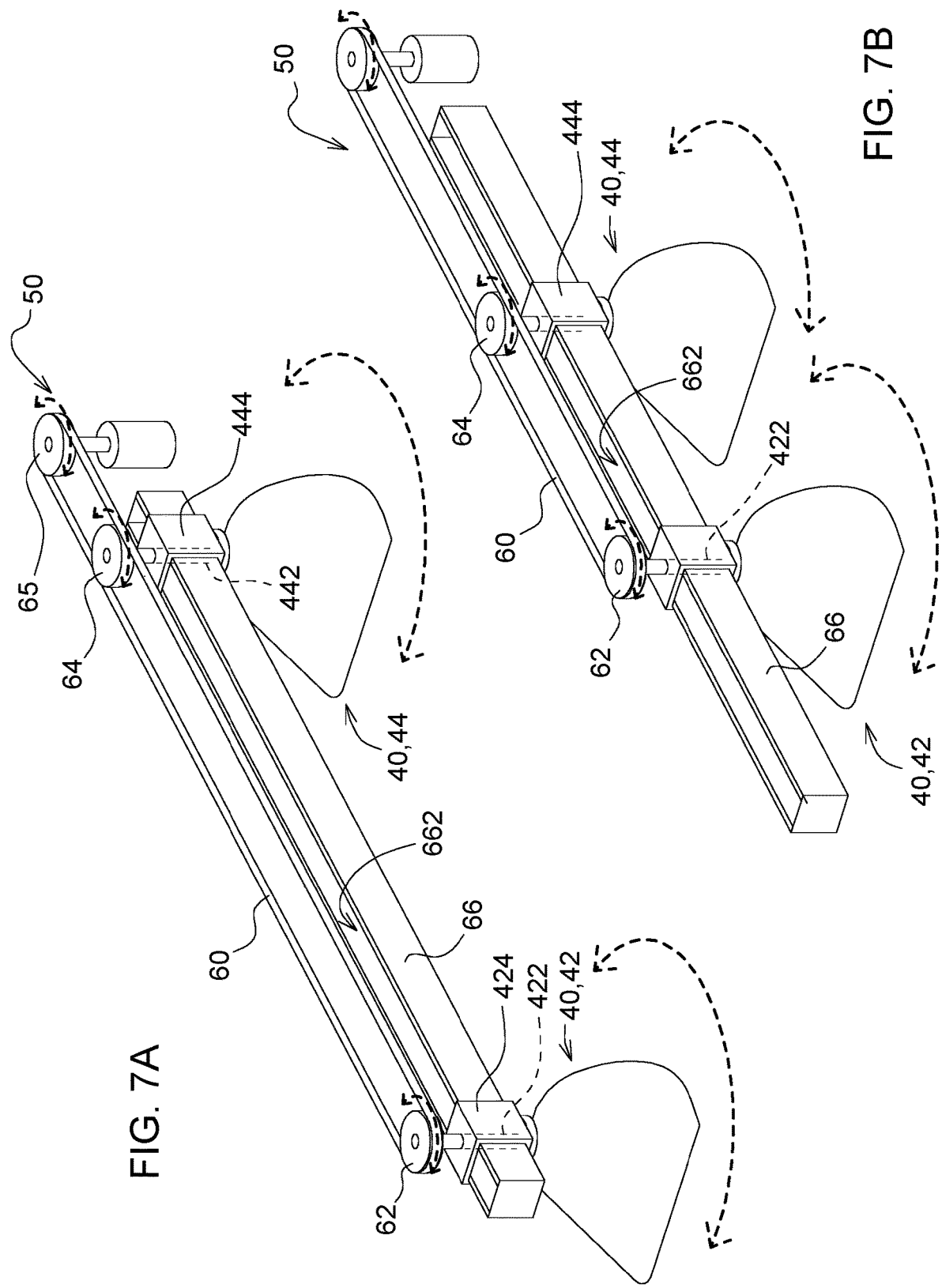

UNIFORM BALE FORMATION SYSTEM

RELATED APPLICATIONS

N/A

FIELD OF THE DISCLOSURE

The present disclosure relates generally to a feeding apparatus of a baler implement.

BACKGROUND OF THE DISCLOSURE

A baler implement gathers crop material from a windrow. The windrow is a row of cut hay or small grain crop that has been cut and dried. The baler implement forms the gathered crop material into a bale. During the crop material gathering, due to differences between the width of the windrow and the effective width which the baler implement can pick up, losses and spoilage of the crop material may occur. An operator may control the baler implement based on their skill and experience to minimize losses and spoilage. For example, the operator may maneuver the baler implement along a Zig Zag driving path to optimize crop gathering while forming a bale of uniform density and size. However, continuous operation in this manner may burden and tire the operator.

SUMMARY OF THE DISCLOSURE

According to an aspect of the present disclosure, a baler implement includes a main frame, a pick-up, a baling system, and a flap. The main frame extends along a central longitudinal axis between a forward end and a rearward end relative to a direction of travel. The pick-up is operable to gather and move crop material along a crop path relative to the main frame. The baling system is attached to the main frame. The baling system defines a baling chamber having an inlet positioned to receive the crop material therethrough from the pick-up. The baling system is operable to form the crop material into a bale within the baling chamber. The flap is positioned downstream of the pick-up and upstream of the inlet relative to movement of the crop material along the crop path. The flap is selectively controllable for movement relative to the central longitudinal axis between a first position of the flap to direct the crop material toward a first lateral side of the baling chamber relative to the central longitudinal axis, and a second position of the flap to direct the crop material toward a second lateral side of the baling chamber relative to the central longitudinal axis.

According to an aspect of the present disclosure, a uniform feeding apparatus of a baler implement is disclosed. The baler implement has a pick-up to gather crop material, and a baling chamber having an inlet. The uniform feeding apparatus includes a flap. The flap is positioned downstream of the pick-up and upstream of the inlet relative to movement of the crop material along the crop path. The flap is selectively controllable for movement relative to a central longitudinal axis of the baler implement between a first position of the flap to direct the crop material toward a first lateral side of the baling chamber relative to the central longitudinal axis, and a second position of the flap to direct the crop material toward a second lateral side of the baling chamber relative to the central longitudinal axis.

Other features and aspects will become apparent by consideration of the detailed description and accompanying drawings.

BRIEF DESCRIPTION OF THE DRAWINGS

The detailed description of the drawings refers to the accompanying figures in which:

FIG. 3D is a schematic top view of the uniform feeding apparatus showing the two flaps controlled independently from the other.

FIG. 3E is a schematic top view of the uniform feeding apparatus showing the two flaps rotated in opposite directions.

FIG. 4B illustrates a single actuator moving the flaps.

FIG. 6A illustrates a single motor swinging one flap and using a belt and roller wheels to swing the other flap.

FIG. 7A illustrates a single motor swinging the flaps via a carrier and the driven elements.

FIG. 7B illustrates the distance between the two flaps that can be adjusted.

DETAILED DESCRIPTION OF THE DISCLOSURE

A good round bale is well-packed, has square corners and has a uniform size across its width. It captures and holds the feed, is easy to handle and will store well with little spoilage. In order to form the good bale, the weight of the bale is evenly or uniformly distributed across a lateral direction. During the bale formation, it is possible that one side of the growing bale is heavier or have a larger diametric size or higher density than the other side of the growing bale. A uniform feeding apparatus, for example, a flap(s) may be applied to a baler implement to guide the crop flow through the baler implement toward the side of the growing bale that is lighter or has smaller diametric size or lower density than the other side in real time to form a good round bale. With the uniform feeding apparatus that guides the crop flow toward two opposite lateral sides of the baling chamber relative to a central longitudinal axis before the crop material enters the inlet of the baling chamber, the characteristic of the bale such as weight, density, and diametric size can be uniformly distributed or presented along the width of the bale to form the good bale. As such, an operator may not need to drive in a specific pattern to form the good bale. The detail of the uniform feeding apparatus and the baler implement the uniform feeding apparatus may be installed on is described below.

Figure 1:
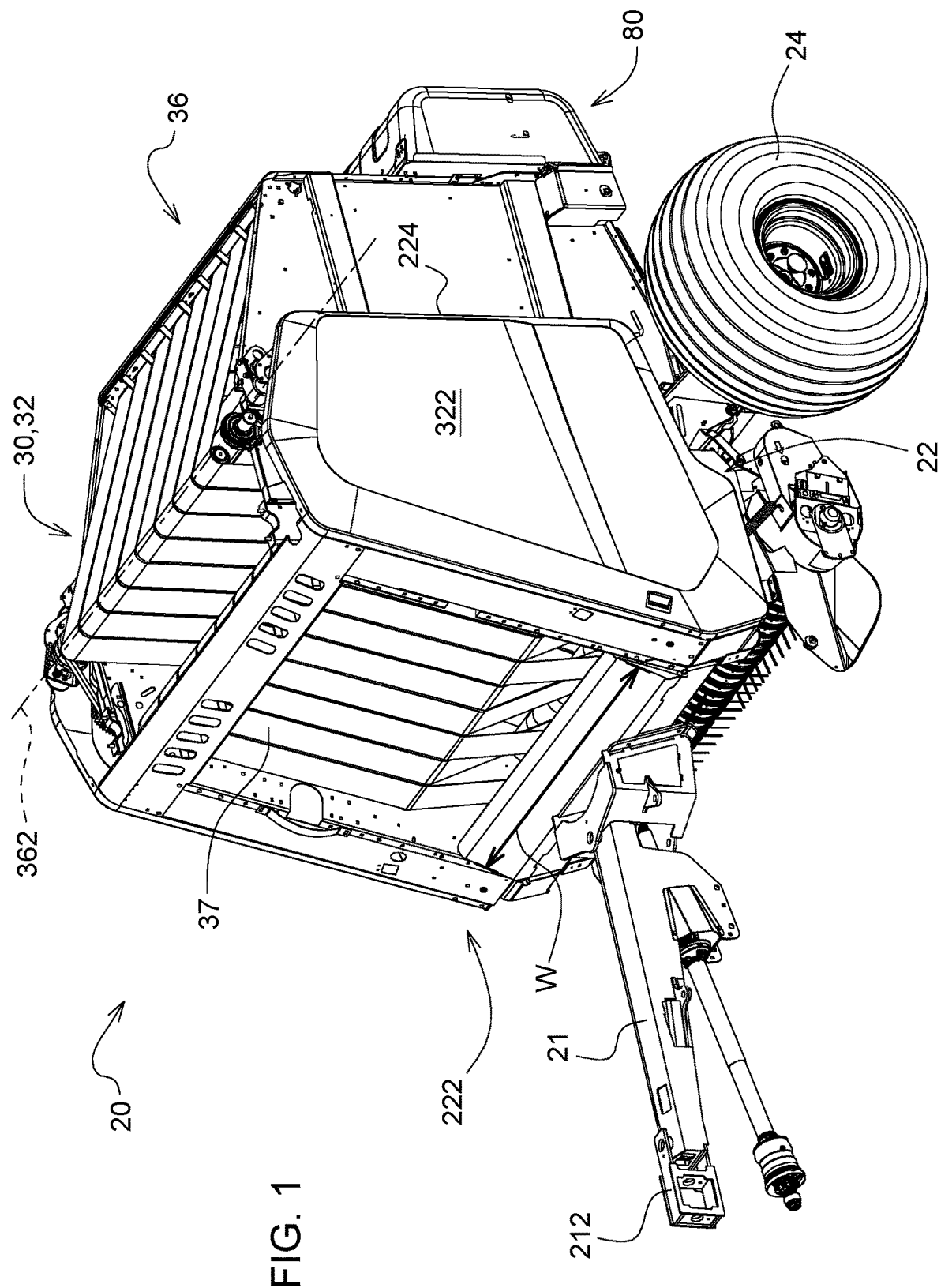
FIG. 1 is a schematic perspective view of a baler implement.
Figure 2:
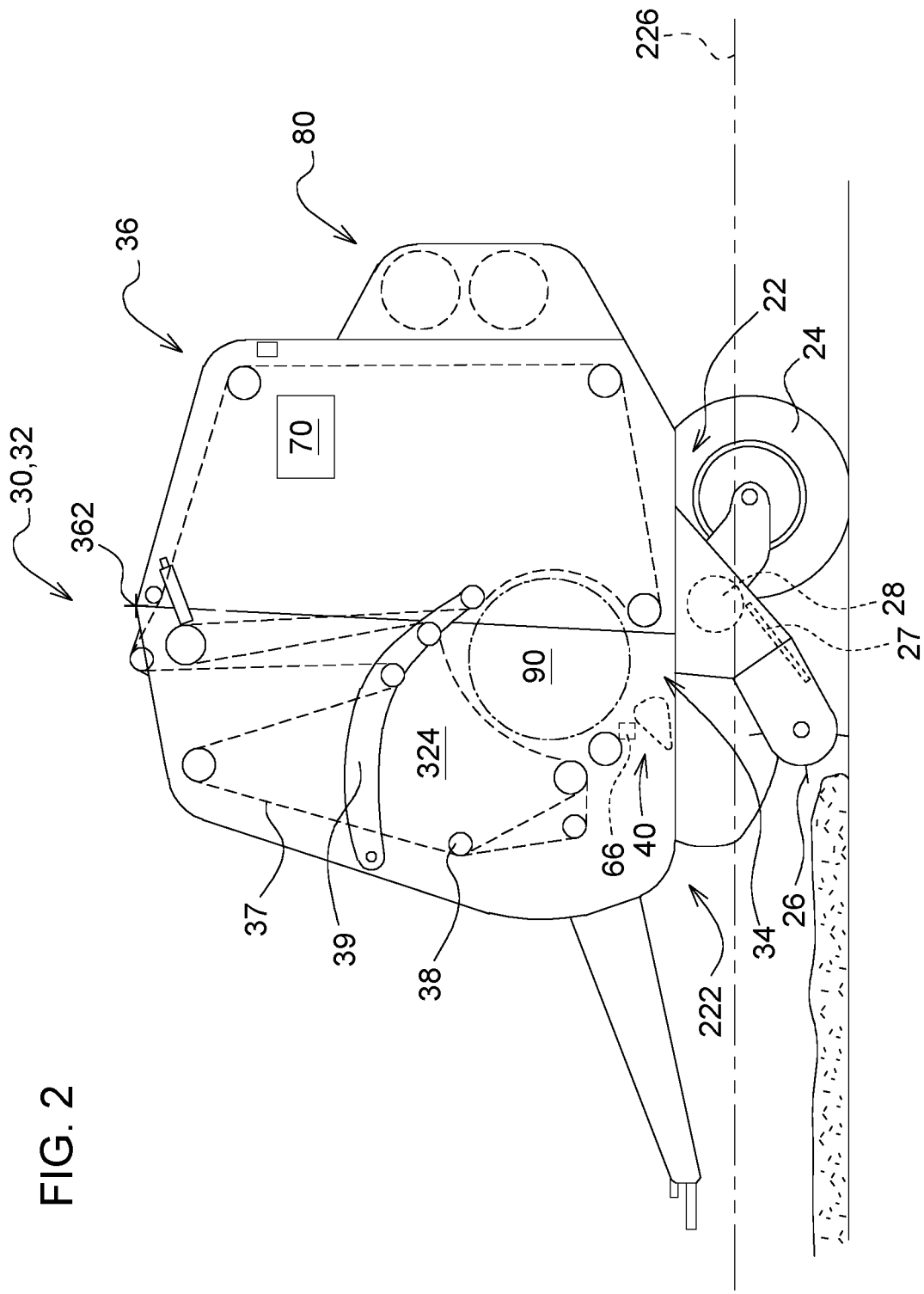
FIG. 2 is a schematic side view of the baler implement of FIG. 1.

Referring to FIGS. 1 and 2, a baler implement 20 is generally shown. The baler implement 20 in this implementation is a round baler with a variable baling chamber; in another implementation, the baler implement 20 can be a round baler with a fixed baling chamber. The baler implement 20 includes a main frame 22. The main frame 22 extends along a central longitudinal axis 226 between a forward end 222 and a rearward end 224 relative to a direction of travel. One or more ground engaging elements 24, such as but not limited to one or more wheels and/or tracks, are attached to and rotatably supported by the main frame 22. A tongue 21 may be coupled to the main frame 22 at a forward end 222 of the main frame 22. A hitch arrangement 212 may be included with the tongue 21. The hitch arrangement 212 may be used to attach the baler implement 20 to a traction unit (not shown), such as but not limited to an agricultural tractor. In other embodiments, the baler implement 20 may be self-propelled, in which case the traction unit and the baler implement 20 are configured as a single, self-propelled vehicle.

The baler implement 20 includes a baling system 30 having a housing 31 forming a baling chamber 32. The housing 31 is attached to and supported by the main frame 22. The housing 31 may include one or more walls or panels that at least partially enclose and/or define the baling chamber 32. The baling chamber 32 has a first lateral side 322 and a second lateral side 324 (FIGS. 3A-3E), as parts of the inner portion of the housing 31, which define the width of the baling chamber 32 in the lateral direction. The baler implement 20 further includes a gate 36. The gate 36 is attached to and rotatably supported by the housing 31. The gate 36 is positioned adjacent a rearward end 224 of the main frame 22 and is pivotably moveable about a gate axis 362. The gate axis 362 is generally horizontal and perpendicular to the central longitudinal axis 226 of the main frame 22. The gate 36 is moveable between a closed position for forming a bale 90 within the baling chamber 32, and an open position for discharging the bale 90 from the baling chamber 32.

The baler implement 20 includes a pick-up 26 disposed proximate the forward end 222 of the main frame 22. The pick-up 26 gathers crop material from a ground surface and directs the gathered crop material toward and into an inlet 34 of the baling chamber 32. The pick-up 26 moves crop material along a crop path 92 relative to the main frame 22. The pick-up 26 may include, but is not limited to tines, forks, augers, conveyors, baffles, etc., for gathering and moving the crop material. The baler implement 20 may be equipped with a pre-cutter 28, disposed between the pick-up 26 and the inlet 34. As such, the pre-cutter 28 is disposed downstream of the pick-up 26 and upstream of the inlet 34 relative to a direction of travel of the crop material. The pre-cutter 28 cuts or chops the crop material into smaller pieces. The baler implement 20 may include a base floor 27 adjacent to the pick-up 26 and under the pre-cutter 28. The base floor 27 may be a concave shape and guide the crop material toward the inlet 34.

The baler implement 20 may be configured as a variable chamber baler, or as a fixed chamber baler. The baler implement 20 shown in the FIGS. 1 and 2 and described herein is depicted and described as a variable chamber baler. As is understood by those skilled in the art, the variable chamber baler includes a plurality of longitudinally extending side-by-side forming belts 37 that are supported by a plurality of rollers 38. The bale 90 is formed by the forming belts 37 and one or more side walls of the housing 31.

The crop material is directed through the inlet 34 and into the baling chamber 32, whereby the forming belts 37 roll the crop material in a spiral fashion into the bale 90 having a cylindrical shape. The forming belts 37 apply a constant pressure to the crop material as the crop material is formed into the bale 90. A belt tensioner 39 continuously moves the forming belts 37 radially outward relative to a center of the cylindrical bale 90 as the diameter of the bale 90 increases. The belt tensioner 39 maintains the appropriate tension in the belts 37 to obtain the desired density of the crop material.

The baler implement 20 includes a wrap system 80. The wrap system 80 is operable to wrap the bale 90 with a wrap material inside the baling chamber 32. Once the bale 90 is formed to a desired size, the wrap system 80 feeds the wrap material into the baling chamber 32 to wrap the bale 90 and thereby secure the crop material in a tight package and maintain the desired shape of the bale 90. The wrap material may include, but is not limited to, a twine, a net mesh, or a solid plastic wrap. Movement of the gate into the open position simultaneously moves the belts clear of the formed bale 90 and allows the formed and wrapped bale to be discharged through the rear of the baling chamber 32.

The baler implement 20 further includes a uniform feeding apparatus 40. The uniform feeding apparatus 40 may include at least one flap. As shown in FIGS. 2, and 3A-3E, the uniform feeding apparatus 40 includes a first flap 42 and a second flap 44. The first flap 42 and the second flap 44 are coupled to the main frame 22 and positioned downstream of the pick-up 26 and upstream of the inlet 34 relative to movement of the crop material along the crop path 92. Since there is the pre-cutter 28 in the implementation, the pre-cutter 28 is disposed downstream of the pick-up 26 and upstream of the first flap 42 and second flap 44 relative to the movement of the crop material along the crop path 92.

In this implementation, the first flap 42 and the second flap 44 are circular sector shapes, each of which is a shape with an arc disposed at a rear end of the first flap 42 and the second flap 44. Alternatively, the first flap 42 and the second flap 44 may include a triangular shape, a rectangular shape, or some other shape. In addition, the number of flaps illustrated herein is only for example. In other implementation, the number of flaps may be one or more than one.

Figure 3A:
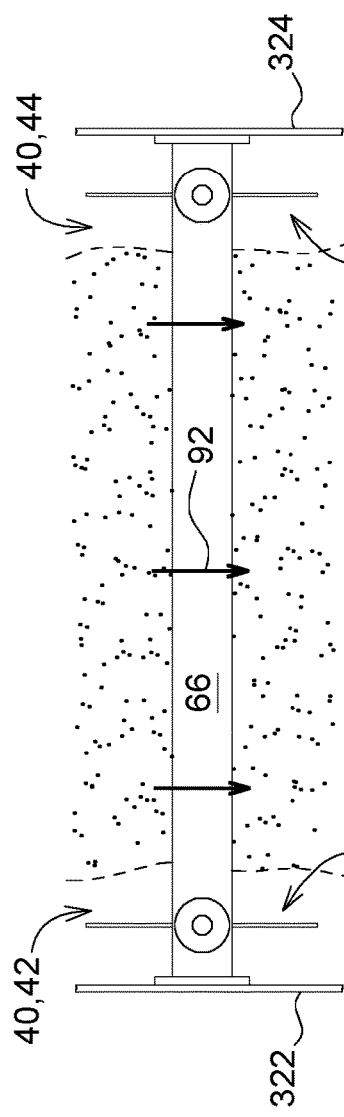
FIG. 3A is a schematic top view of a uniform feeding apparatus of the baler implement, showing two flaps of the uniform feeding apparatus in neutral positions.

Referring to FIGS. 3A, the first flap 42 has a neutral position FN in which the first flap 42 is parallel to the central longitudinal axis 226 of the main frame 22; the second flap 44 has a neutral position SN in which the second flap 44 is also parallel to the central longitudinal axis 226 of the main frame 22. When the bale 90 is being formed uniformly in a lateral direction, the first flap 42 and the second flap 44 remain on the neutral positions FN, SN. As used herein, it should be appreciated that the lateral direction is perpendicular to the central longitudinal axis 226.

Figure 3B:
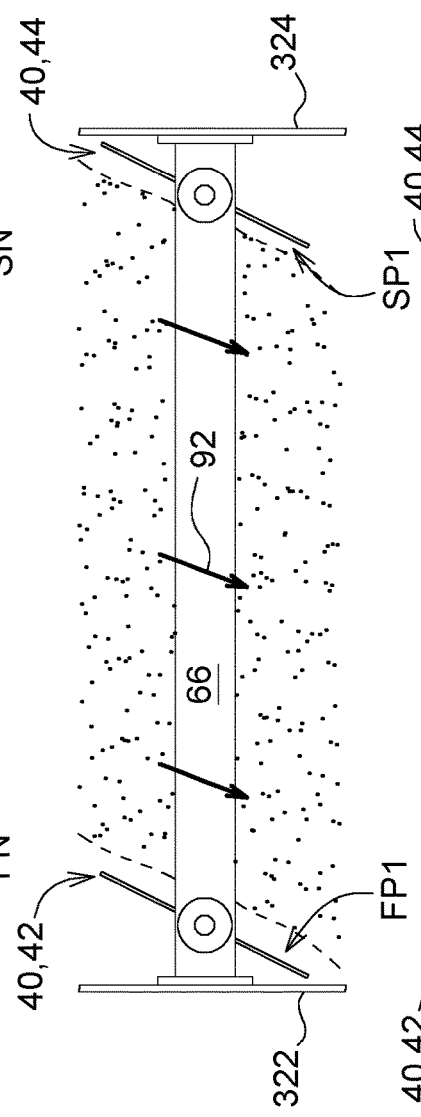
FIG. 3B is a schematic top view of the uniform feeding apparatus showing the two flaps in respective first positions.
Figure 3C:
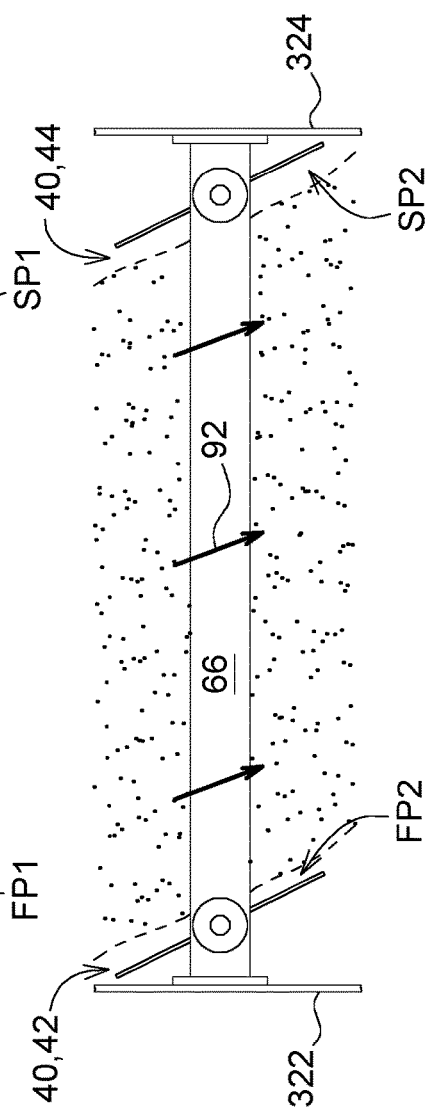
FIG. 3C is a schematic top view of the uniform feeding apparatus showing the two flaps in respective second positions.

The first flap 42 is selectively controllable for movement relative to the central longitudinal axis 226 between a first position FP1 of the first flap 42 to direct the crop material toward the first lateral side 322 of the baling chamber 32 relative to the central longitudinal axis 226, as shown in FIG. 3B, and a second position FP2 of the first flap 42 to direct the crop material toward the second lateral side 324 of the baling chamber 32 relative to the central longitudinal axis 226, as shown in FIG. 3C. Similarly, the second flap 44 is selectively controllable for movement relative to the central longitudinal axis 226 between a first position SP1 of the second flap 44 to direct the crop material toward the first lateral side 322 of the baling chamber 32 relative to the central longitudinal axis 226, as shown in FIG. 3B, and a second position SP2 of the second flap 44 to direct the crop material toward the second lateral side 324 of the baling chamber 32 relative to the central longitudinal axis 226, as shown in FIG. 3C.

When one side of the bale 90 corresponding to the first lateral side 322 of the baling chamber 32 has a lesser weight, a lower density, or a smaller diametric size, the first flap 42 and the second flap 44 may be moved to the first positions FP1, SP1 to direct the crop material toward the first lateral side 322. On the contrary, when another side of the bale 90 corresponding to the second lateral side 324 of the baling chamber 32 has a lesser weight, a lower density, or a smaller diametric size, the first flap 42 and the second flap 44 may be moved to the second positions FP2, SP2 to direct the crop material toward the second lateral side 324. Because the first flap 42 and second flap 44 are operable to switch between the neutral positions FN, SN, the first positions FP1, SP1, and the second positions FP2, SP2, the operator may not have to follow a Zig Zag driving path with multiple tight turns while gathering the crop material.

In addition, the first flap 42 and the second flap 44 may rotate independently from one another, described in greater detail below.

Referring to FIGS. 3D and 3E, when the first flap 42 and the second flap 44 are respectively driven by different actuators or motors, the first flap 42 and the second flap 44 may rotate independently from one another. For example, as shown in FIG. 3D, the first flap 42 may rotate to the second position FP2 and the second flap 44 remains at the neutral position SN. The first flap 42 and the second flap 44 may rotate in opposite directions. As shown in FIG. 3E, the first flap 42 rotates to the second position FP2 and the second flap 44 rotates to the first position FP1.

The baler implement 20 may further include a drive mechanism 50 coupled to the uniform feeding apparatus 40. The drive mechanism 50 is operable to move the uniform feeding apparatus 40, and the uniform feeding apparatus 40 directs the crop material toward the first lateral side 322 or the second lateral side 324 of the baling chamber 32 before the crop material enter the inlet 34. The drive mechanism 50 may have one or more motors and/or actuators to drive and/or move the one or more flap (such as the first flap 42 and the second flap 44) directly or indirectly.

Figure 4A:
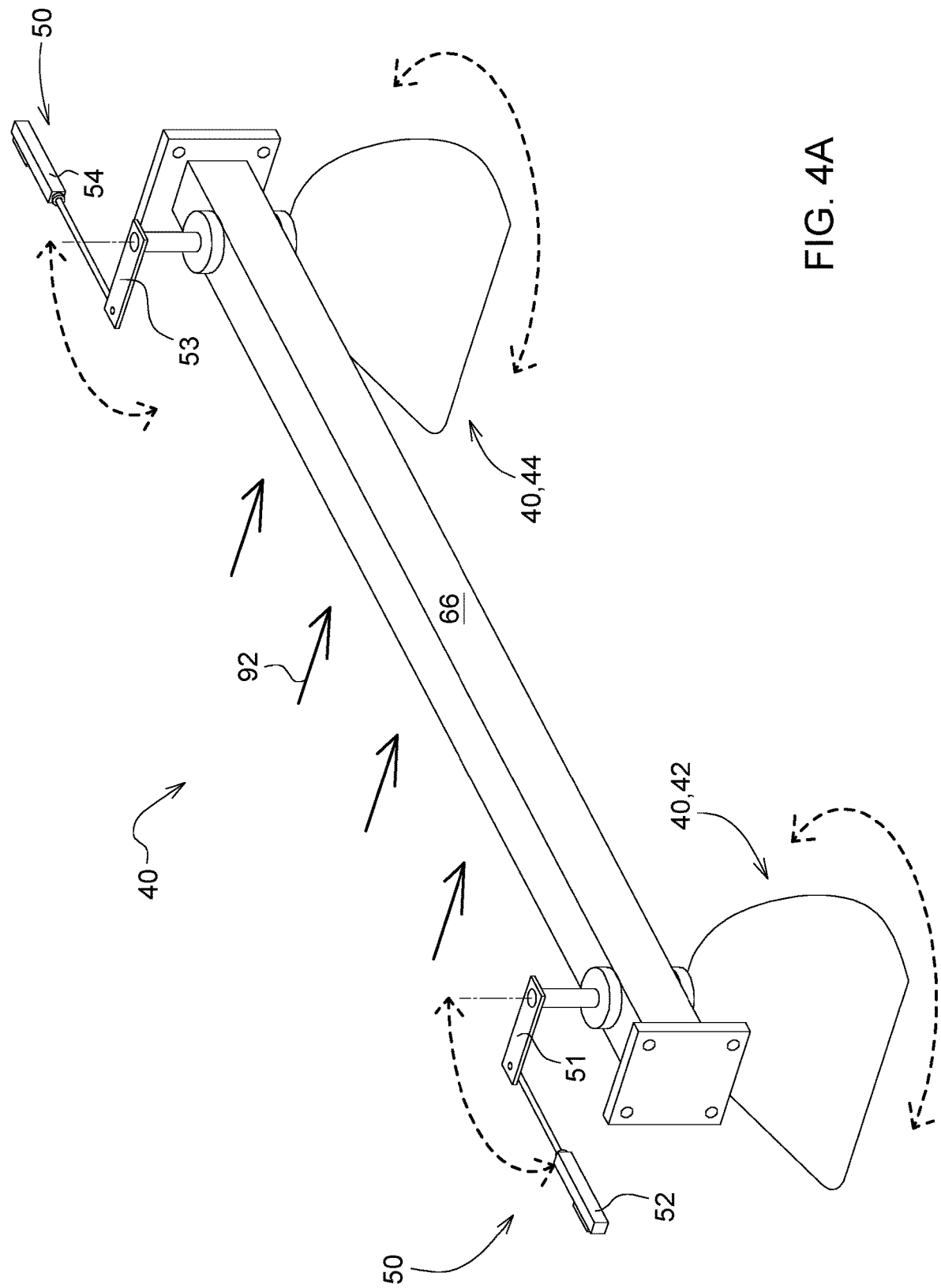
FIG. 4A illustrates two actuators, each of which independently moves one of the flaps.

Referring to FIG. 4A, the drive mechanism 50 includes a first lever 51 and a first actuator 52. One end of the first lever 51 is coupled to the first flap 42 and the other end of the first lever 51 is coupled to the first actuator 52, with the first actuator 52 selectively controllable to move the first lever 51 to in-turn move the first flap 42. The drive mechanism 50 also includes a second lever 53 and a second actuator 54 coupled to the second flap 44. Similar to the connection between the first lever 51 and the first actuator 52, one end of the second lever 53 is coupled to the second flap 44 and the other end of the second lever 53 is coupled to the second actuator 54, with the second actuator 54 selectively controllable to move the second lever 53 to in-turn move the second flap 44. As such, the second lever 53 and the second actuator 54 are operable to move the second flap 44 independent from the first flap 42. The first actuator 52 and the second actuator 54 may include, but are not limited to, electronic actuators or hydraulic cylinders.

Referring to FIG. 4B, another implementation of the drive mechanism 50 is shown. The drive mechanism 50 includes the first lever 51, the first actuator 52, and the second lever 53. The first actuator 52, as a single actuator in this implementation, is coupled to the first lever 51 and to the second lever 53 via a connector 55. The first actuator 52 is selectively controllable to move the first lever 51 to in-turn move the first flap 42 and to move the second lever 53 to in-turn move the second flap 44.

Figure 5:
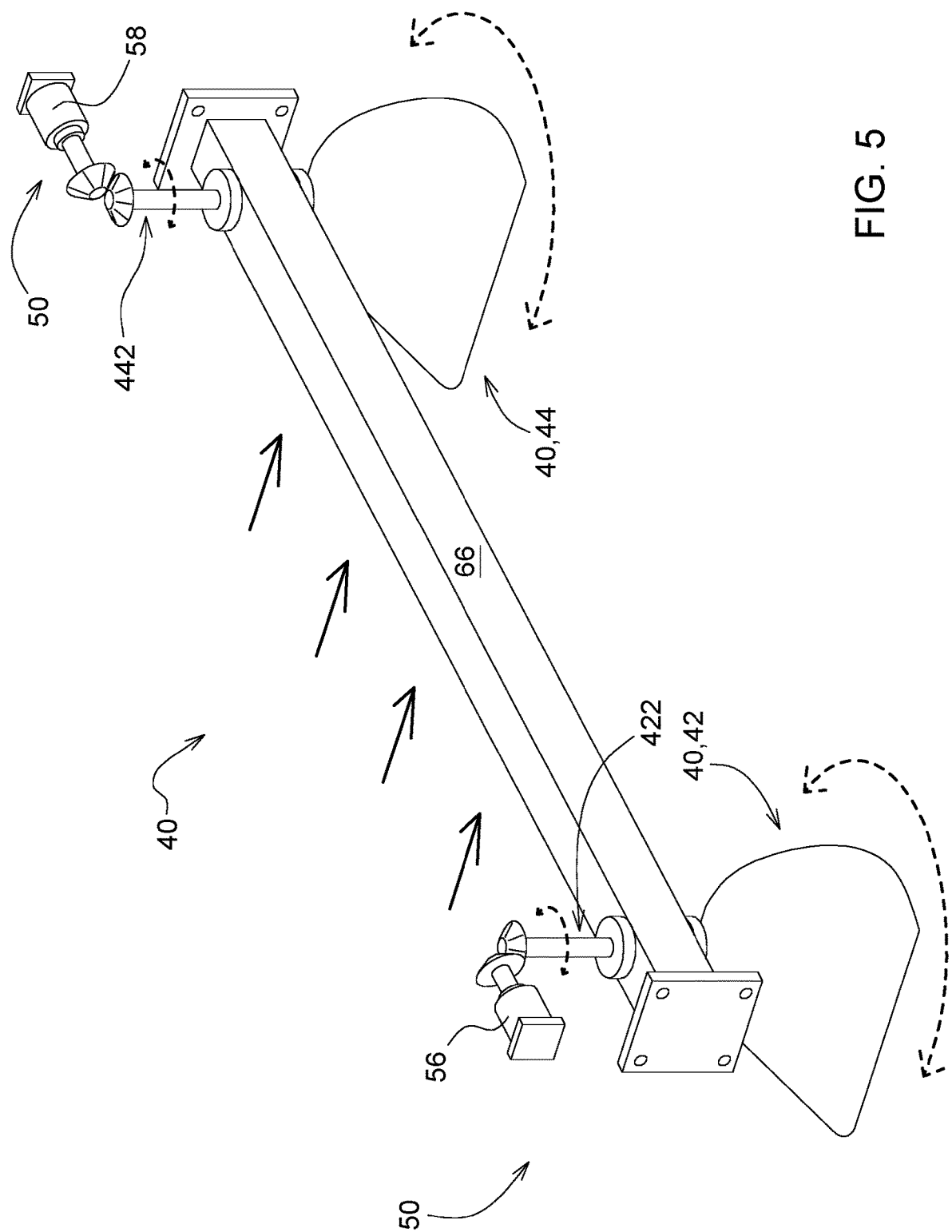
FIG. 5 illustrates two motors, each of which independently swings one of the flaps.

Referring to FIG. 5, another implementation of the drive mechanism 50 is shown. The drive mechanism 50 includes a first motor 56 coupled to the first flap 42. The first motor 56 includes a rotational output operable to swing the first flap 42. The drive mechanism 50 further includes a second motor 58 coupled to the second flap 44. Similar to the first motor 56, the second motor 58 includes a rotational output operable to swing the second flap 44. As such, the second motor 58 is operable to swing the second flap 44 independent from the first flap 42. It is noted that there are different ways to connect the first flap 42 to the first motor 56 and to connect the second flap 44 to the second motor 58 to ensure the first flap 42 and the second flap 44 are rotated by the first motor 56 and the second motor 58. For example, each of the top or the bottom of the first flap 42 and/or the second flap 44 may include or extend to a connector/extension 422 or 442. In this implementation, the connectors/extensions 422, 442 are pinon gears. The pinon gear of the first flap 42 meshes with a pinion gear extending from or coupled to the first motor 56 that rotates to swing the first flap 42. Likewise, the pinon gear of the second flap 44 meshes with a pinion gear extended from or coupled to the second motor 58 that rotates to swing the second flap 44.

Figure 6B:
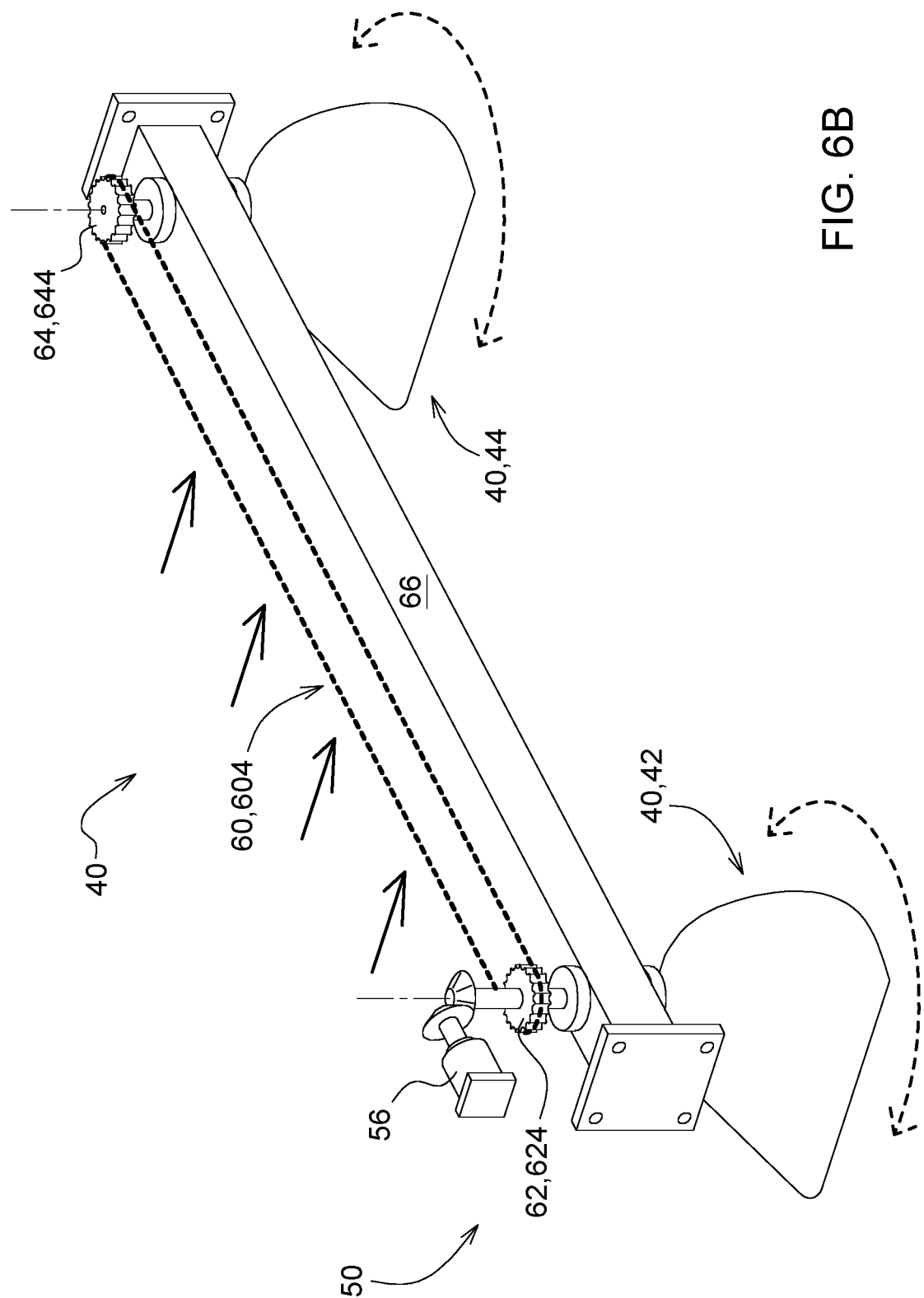
FIG. 6B illustrates a single motor swinging one flap and using a chain and sprocket wheels to swing the other flap.

FIGS. 6A and 6B respectively illustrate implementations having a single motor that swings the first flap 42 and the second flap 44. The drive mechanism 50 includes the first motor 56 as the single motor. The first motor 56 includes the rotational output operable to swing the first flap 42 and the second flap 44. The first motor 56 of drive mechanism 50 is coupled to the first flap 42 and to the second flap 44 and is operable to simultaneously move the first flap 42 and the second flap 44.

Referring to FIG. 6A, the drive mechanism 50 includes a carrier 60, a first driven element 62, and a second driven element 64. The first driven element 62 is rotatably driven by one of the carrier 60 and the first motor 56 to swing the first flap 42. The first driven element 62 in this implementation is rotatably driven by the first motor 56, with a pinion gear extending from or coupled to the first flap 42 meshing with a pinion gear extending from or coupled to the first motor 56. Here, the carrier 60 is a belt 602, and the first driven element 62 and second driven element 64 are roller wheels 622, 642 engaging the belt 602. An extension (rod) couples the roller wheel 622 to the first flap 42. One end of the extension includes the drive pinion to receive the rotational output from the first motor 56 such that the first flap 42 and the roller wheel 622 are rotated with the first motor 56. The roller wheel 622 drives the belt 602 via the friction therebetween. The second driven element 64 (roller wheel 642) is rotatably driven by the carrier 60 (belt 602) to swing the second flap 44. An extension (rod) couples the roller wheel 642 to the second flap 44 such that the second flap 44 is rotated with the roller wheel 642.

It is noted that in another implementation, the roller wheel 622 is rotatably driven by the belt 602 rather than directly driven by the pinion gear of the first motor 56 if the first motor 56 drives another roller wheel to move the belt 602 (not shown).

Referring to FIG. 6B, the carrier 60 in this implementation is a chain 604, and the first driven element 62 and second driven element 64 are sprocket wheels 624, 644 engaging the chain 604. The sprocket wheel 624 is rotatably driven by the first motor 56 to swing the first flap 42 with a pinion gear extending from or coupled to the first flap 42 meshing with a pinion gear extending from or coupled to the first motor 56. An extension (rod) couples the sprocket wheel 624 to the first flap 42. One end of the extension includes the drive pinion to receive the rotational output from the first motor 56 such that the first flap 42 and the sprocket wheel 624 are rotated with the first motor 56. The sprocket wheel 624 drives the chain 604 via the teeth of the sprocket wheel 624 engaging with the chain 604. The second driven element 64 (sprocket wheel 644) is rotatably driven by the carrier 60 (chain 604) to swing the second flap 44. An extension (rod) couples the roller wheel 642 to the second flap 44 such that the second flap 44 is rotated with the roller wheel 642.

Referring to FIG. 7A, it is noted that in another implementation, the first driven element 62 (roller wheel) and the second driven element 64 (roller wheel) are the driven by the carrier 60 (belt) to rotate the first flap 42 and the second flap 44 if the drive mechanism 50 (motor) rotates a third driven element 65 (roller wheel) to move the carrier 60.

There are many ways to support the uniform feeding apparatus 40 and/or the drive mechanism 50. As shown in FIGS. 2, 6A, 6B, 7A, and 7B, the drive mechanism 50 includes a support structure 66 laterally coupled to two opposing lateral sides of the main frame 22 relative to the central longitudinal axis 226. The support structure 66 may be mounted adjacent to the inlet 34 of the baling chamber 32. The first driven element 62 and the second driven element 64 are rotatably coupled to the support structure 66. For example, the extensions (rods) of the first flap 42 and the second flap 44 may be positioned through apertures of the support structure 66 with stops such as nuts to adjust relevant position between the extensions and the support structure 66. With the implementation of the support structure 66, the uniform feeding apparatus 40 and the drive mechanism 50 may be easily applied to a current existing baler. In another implementation, the support structure 66 may be a part of the base floor 27 or other structure between the inlet 34 and the base floor 27 of or under the pre-cutter 28 (not shown). The bases of the first flap 42 and the second flap 44 may be pivotally attached on or embedded on the top of the base floor 27, with extensions from the bases extending downward to be coupled to the actuator(s) or the motor(s) (not shown).

Referring to FIG. 7B, the distance between the first flap 42 and the second flap 44 may be adjusted. For example, the support structure 66 may include a slot 662. The extension 422 from the first flap 42 and the extension 442 from the second flap 44. As such, the extensions 422 and 442 can slide to any location within the slot 662 of the support structure 66 to determine the distance between the first flap 42 and the second flap 44 before the first flap 42 and second flap 44 are fixed on the support structure 66 by mounting elements 424, 444 such as brackets.

The baler implement 20 may further include a sensor(s) 70 operable to detect a characteristic of the bale 90 on both the first lateral side 322 and the second lateral side 324 of the baling chamber 32. The characteristic of the bale 90 is related to a distribution of the crop material across a width W of the main frame 22 (as shown in FIG. 1). The sensor 70 can be a camera, load sensor, displacement sensor, or any other type of sensor.

Figure 8:
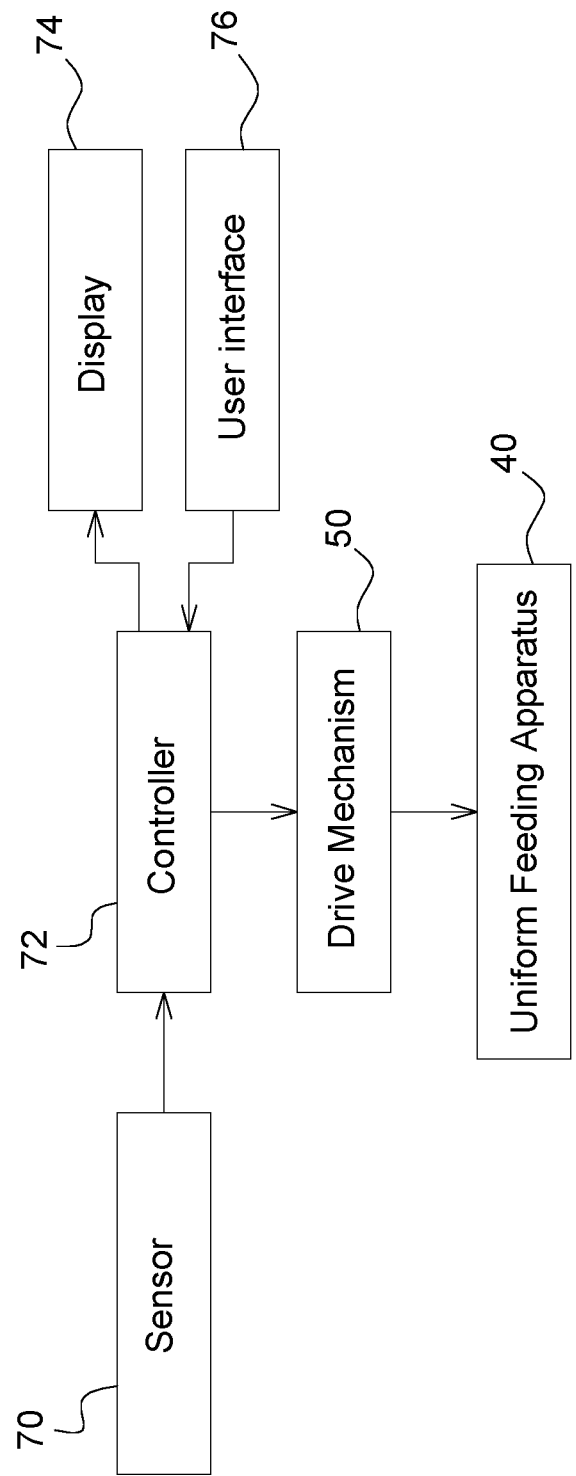
FIG. 8 is a block diagram showing a system to control the flaps.

Referring to FIG. 8, the baler implement 20 also includes a controller 72 in communication with the sensor 70. The controller 72 is operable to receive a signal from the sensor 70. The controller 72 may be electrically connected to a display 74 and a user interface 76. The display 74 may show the image (e.g., the shape or size of the forming bale, or the crop flow before the inlet 34) or values indicative of the characteristic of the bale 90. The operator may then utilize the user interface 76, such as a joystick, a switch, a knob, a voice control device (not shown) to input a command, the signal of which is later received by the controller 72. It is noted that the display 74 and the user interface 76 may be integrated together as one apparatus, such as a touch screen. The controller 72 may transmit a control signal based on the command from the user interface 76 to control the drive mechanism 50. In one implementation, if the drive mechanism 50 is hydraulically driven, the control signal may control one or more solenoid valves to determine the direction of the hydraulic fluid so as to determine the extension or retraction of the hydraulic actuators. In another implementation, if the drive mechanism 50 is electrically driven, the control signal may control the extension or retraction of the electric actuator(s) or the rotation of electric motor(s). As such, the uniform feeding apparatus 40 (such as the first flap 42 and the second flap 44) is rotated under the operator's command to direct the crop material. Instead of operator's control of the user interface 76, the controller 72 may automatically control the drive mechanism 50 through an algorithm. The controller 72 here may include a computing device which includes or is associated with a memory. The algorithm is saved in the memory. The controller 72 may include one or more processing units, which may receive one or more measuring signals from one or more sensors 70. The controller 72 may determine an amount of movement of the flaps 42, 44 relative to the central longitudinal axis 226 of the main frame 22. When the bale 90 is forming uniformly along the width between the first lateral side 322 and the second lateral side 324 of the baling chamber 32 with respect to one of a density, a weight, or a diametric size of the bale 90, the controller 72 is operable to position the first flap 42 and second flap 44 in their respective neutral positions FN, SN in which the first flap 42 and the second flap 44 are parallel to the central longitudinal axis 226 of the main frame 22. When one of a density, a weight, or a diametric size of the bale 90 varies by more than a predefined amount defined in the algorithm, which is prestored in the memory, between the first lateral side 322 and the second lateral side 324 of the baling chamber 32, the controller 72 is operable to position the first flap 42 and second flap 44 in one of the first positions FP1, SP1 or the second position FP2, SP2 to direct the crop material toward the one of the first lateral side 322 and the second lateral side 324 of the baling chamber 32 in which the one of the density, the weight, or the diametric size of the bale 90 is lesser than the other one of the first lateral side 322 and the second lateral side 324 of the baling chamber 32. In another implementation, when the first flap 42 and the second flap 44 are moved by different actuators or motors, as shown in FIGS. 4A and 5, the first flap 42 and the second flap 44 may rotate in different degrees or amounts, depending on the need to form the uniform bale 90 or to simplify the drive path of the baler implement 20.

Without in any way limiting the scope, interpretation, or application of the claims appearing below, a technical effect of one or more of the example embodiments disclosed herein is to direct the crop material toward one of the lateral sides of the baling chamber to form a uniform bale. Another technical effect of one or more of the example embodiments disclosed herein is to allow the operator of the baler implement to drive in a smooth path instead of a Zig Zag driving path with multiple tight turns.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A baler implement comprising:
a main frame extending along a central longitudinal axis between a forward end and a rearward end relative to a direction of travel;
a pick-up operable to gather and move crop material along a crop path relative to the main frame;
a baling system attached to the main frame, the baling system defining a baling chamber having an inlet positioned to receive the crop material therethrough from the pick-up, the baling system operable to form the crop material into a bale within the baling chamber;
a flap positioned downstream of the pick-up and upstream of the inlet relative to movement of the crop material along the crop path, wherein the flap is selectively controllable for movement relative to the central longitudinal axis between a first position of the flap to direct the crop material toward a first lateral side of the baling chamber relative to the central longitudinal axis and a second position of the flap to direct the crop material toward a second lateral side of the baling chamber relative to the central longitudinal axis; and
a drive mechanism coupled to the flap and including a support structure laterally coupled to two opposing lateral sides of the main frame relative to the central longitudinal axis;
wherein the flap is adjustable in locations along the support structure and is fixed by a mounting element;
wherein the support structure includes a slot and the flap extends an extension operable to slide within the slot to adjust the location of the flap on the support structure.

2. The baler implement of claim 1, wherein the drive mechanism is operable to move the flap between the first position and the second position.

3. The baler implement of claim 2, wherein the drive mechanism includes a motor coupled to the flap, wherein the motor includes a rotational output operable to swing the flap.

4. The baler implement of claim 2, further comprising a second flap coupled to the main frame, wherein the second flap is disposed downstream of the pick-up and upstream of the inlet relative to movement of the crop material along the crop path, wherein the second flap is selectively controllable for movement relative to the central longitudinal axis between a first position of the second flap to direct the crop material toward the first lateral side of the baling chamber relative to the central longitudinal axis and a second position of the second flap to direct the crop material toward the second lateral side of the baling chamber relative to the central longitudinal axis.

5. The baler implement of claim 4, wherein the drive mechanism includes a motor coupled to the flap and to the second flap, wherein the motor is operable to simultaneously move the flap and the second flap.

6. The baler implement of claim 5, wherein the drive mechanism includes a carrier, a first driven element, and a second driven element, and the first driven element is rotatably driven by one of the carrier and the motor to swing the flap, and the second driven element is rotatably driven by the carrier to swing the second flap.

7. The baler implement of claim 6, wherein the first driven element and the second driven element are rotatably coupled to the support structure.

8. The baler implement of claim 1, further comprising a sensor operable to detect a characteristic of the bale on both the first lateral side and the second lateral side of the baling chamber.

9. The baler implement of claim 8, wherein the characteristic of the bale is related to a distribution of the crop material across a width of the main frame.

10. The baler implement of claim 8, further comprising a controller in communication with the sensor and operable to receive a signal from the sensor, wherein the controller is configured to determine an amount of movement of the flap relative to the central longitudinal axis of the main frame.

11. The baler implement of claim 10, wherein when one of a density, a weight, or a diametric size of the bale varies by more than a predefined amount between the first lateral side and the second lateral side of the baling chamber, the controller is operable to position the flap in one of the first position or the second position to direct the crop material toward the one of the first lateral side and the second lateral side of the baling chamber in which the one of the density, the weight, or the diametric size of the bale is lesser than the other one of the first lateral side and the second lateral side of the baling chamber.

12. The baler implement of claim 1, wherein the flap is a circular sector shape with an arc disposed at a rear end of the flap.

13. The baler implement of claim 1, further comprising a pre-cutter disposed downstream of the pick-up and upstream of the flap relative to the movement of the crop material along the crop path, wherein the pre-cutter is operable to cut or chop the crop material into smaller pieces.

14. A baler implement comprising:
a main frame extending along a central longitudinal axis between a forward end and a rearward end relative to a direction of travel;
a pick-up operable to gather and move crop material along a crop path relative to the main frame;
a baling system attached to the main frame, the baling system defining a baling chamber having an inlet positioned to receive the crop material therethrough from the pick-up, the baling system operable to form the crop material into a bale within the baling chamber; and
a flap positioned downstream of the pick-up and upstream of the inlet relative to movement of the crop material along the crop path, wherein the flap is selectively controllable for movement relative to the central longitudinal axis between a first position of the flap to direct the crop material toward a first lateral side of the baling chamber relative to the central longitudinal axis and a second position of the flap to direct the crop material toward a second lateral side of the baling chamber relative to the central longitudinal axis;
a drive mechanism coupled to the flap and operable to move the flap between the first position and the second position; and
a second flap coupled to the main frame, wherein the second flap is disposed downstream of the pick-up and upstream of the inlet relative to movement of the crop material along the crop path, wherein the second flap is selectively controllable for movement relative to the central longitudinal axis between a first position of the second flap to direct the crop material toward the first lateral side of the baling chamber relative to the central longitudinal axis and a second position of the second flap to direct the crop material toward the second lateral side of the baling chamber relative to the central longitudinal axis;

wherein the drive mechanism includes a motor coupled to the flap and to the second flap, wherein the motor is operable to simultaneously move the flap and the second flap;

wherein the drive mechanism includes a carrier, a first driven element, and a second driven element, and the first driven element is rotatably driven by one of the carrier and the motor to swing the flap, and the second driven element is rotatably driven by the carrier to swing the second flap;

wherein the carrier is a belt, and the first driven element and the second driven element are roller wheels engaging the belt.

15. A baler implement comprising:

a main frame extending along a central longitudinal axis between a forward end and a rearward end relative to a direction of travel;

a pick-up operable to gather and move crop material along a crop path relative to the main frame;

a baling system attached to the main frame, the baling system defining a baling chamber having an inlet positioned to receive the crop material therethrough from the pick-up, the baling system operable to form the crop material into a bale within the baling chamber; and a flap positioned downstream of the pick-up and upstream of the inlet relative to movement of the crop material along the crop path, wherein the flap is selectively controllable for movement relative to the central longitudinal axis between a first position of the flap to direct the crop material toward a first lateral side of the baling chamber relative to the central longitudinal axis and a second position of the flap to direct the crop material toward a second lateral side of the baling chamber relative to the central longitudinal axis;

a sensor operable to detect a characteristic of the bale on both the first lateral side and the second lateral side of the baling chamber; and a controller in communication with the sensor and operable to receive a signal from the sensor, wherein the controller is configured to determine an amount of movement of the flap relative to the central longitudinal axis of the main frame;

wherein when the bale is forming uniformly on both the first lateral side and the second lateral side of the baling chamber with respect to one of a density, a weight, or a diametric size of the bale, the controller is operable to position the flap in a neutral position in which the flap is parallel to the central longitudinal axis of the main frame.

* * * * *